US012614765B2

(12) United States Patent
Cheng et al.

(10) Patent No.: US 12,614,765 B2
(45) Date of Patent: Apr. 28, 2026

(54) BATTERY, BATTERY PACK AND ELECTRIC EQUIPMENT

(71) Applicant: Cornex New Energy Co., Ltd., Wuhan (CN)

(72) Inventors: Shengbing Cheng, Wuhan (CN); Yuanfu Jiang, Wuhan (CN); Bing Dong, Wuhan (CN); Boyi Li, Wuhan (CN)

(73) Assignee: Comex New Energy Co., Ltd, Wuhan (CN)

( * ) Notice: Subject to any disclaimer, the term of this patent is extended or adjusted under 35 U.S.C. 154(b) by 581 days.

(21) Appl. No.: 18/343,338

(22) Filed: Jun. 28, 2023

(65) Prior Publication Data

US 2024/0347782 A1     Oct. 17, 2024

(30) Foreign Application Priority Data

Apr. 12, 2023    (CN) .......................... 202310407797.6

(51) Int. Cl.
*H01M 10/42* (2006.01)
*H01M 10/052* (2010.01)
(Continued)

(52) U.S. Cl.
CPC ..... *H01M 10/4235* (2013.01); *H01M 10/052* (2013.01); *H01M 10/0587* (2013.01);
(Continued)

(58) Field of Classification Search
CPC .......... H01M 10/0431; H01M 10/052; H01M 10/0525; H01M 10/0587; H01M 10/4235; H01M 10/4242; H01M 2200/00; H01M 2200/20; H01M 2220/20; H01M 2220/30; H01M 50/107; H01M 50/3425; H01M 50/383; H01M 50/538; H01M 50/682; Y02E 60/10
See application file for complete search history.

(56) References Cited

U.S. PATENT DOCUMENTS

2006/0275665 A1* 12/2006 Hyung ................ H01M 50/375
429/223

FOREIGN PATENT DOCUMENTS

CN           111261923 B  *  7/2021  ............ H01M 50/60

OTHER PUBLICATIONS

Machine translation CN111261923A (Year: 2020).*

* cited by examiner

*Primary Examiner* — Victoria H Lynch
(74) *Attorney, Agent, or Firm* — Maginot, Moore & Beck LLP

(57) ABSTRACT

A battery includes a shell having an inner cavity; a wound core assembled in the inner cavity of the shell; a column supported in the wound core, wherein the column includes a first cavity for storing a lithium-replenishing medium and a second cavity for storing a fire-fighting medium, a cavity wall of the first cavity having a first hole, and a cavity wall of the second cavity having a second hole; a first membrane configured to block the first hole, and configured to break when subjected to a first pressure, allowing the lithium-replenishing medium in the first cavity to flow into the inner cavity; and a second membrane configured to block the second hole, and configured to break when subjected to a second pressure, allowing the fire-fighting medium in the second cavity to flow into the inner cavity, the second pressure being greater than the first pressure.

20 Claims, 2 Drawing Sheets

(51) Int. Cl.

| | |
|---|---|
| *H01M 10/0587* | (2010.01) |
| *H01M 50/107* | (2021.01) |
| *H01M 50/342* | (2021.01) |
| *H01M 50/383* | (2021.01) |
| *H01M 50/538* | (2021.01) |
| *H01M 50/682* | (2021.01) |

(52) U.S. Cl.

CPC ..... *H01M 50/107* (2021.01); *H01M 50/3425* (2021.01); *H01M 50/383* (2021.01); *H01M 50/538* (2021.01); *H01M 50/682* (2021.01); *H01M 2200/20* (2013.01)

BATTERY, BATTERY PACK AND ELECTRIC EQUIPMENT

CROSS-REFERENCE TO RELATED APPLICATION

This application is based on and claims priority to Chinese Patent Application No. 202310407797.6 filed on Apr. 12, 2023, the entire content of which is incorporated herein by reference for all purposes.

FIELD

The present disclosure relates to the field of batteries, in particular to a battery, a battery pack using the battery, and electric equipment using the battery or the battery pack.

BACKGROUND

Batteries are energy storage devices that convert chemical energy into electric energy. In recent years, with the promotion of new energy, batteries are also applied in more and more fields. However, in the related art, single-cell batteries have problems such as the inability of realizing secondary replenishment of lithium ions, short battery life, and severe attenuation. Moreover, due to limited conditions, some batteries cannot be provided with explosion-proof valves, so that the single-cell batteries cannot implement effective gas exhaust, which weakens the safety of using the batteries.

SUMMARY

A battery according to embodiments of the present disclosure includes: a shell having an inner cavity; a wound core assembled in the inner cavity of the shell; a column supported in the wound core to prevent the wound core from collapsing, wherein the column includes a first cavity configured to store a lithium-replenishing medium and a second cavity configured to store a fire-fighting medium, a cavity wall of the first cavity having a first hole, and a cavity wall of the second cavity having a second hole; a first membrane configured to block the first hole, the first membrane being configured to break when subjected to a first pressure, allowing the lithium-replenishing medium in the first cavity to flow into the inner cavity through the first hole; and a second membrane configured to block the second hole, the second membrane being configured to break when subjected to a second pressure, allowing the fire-fighting medium in the second cavity to flow into the inner cavity through the second hole, wherein the second pressure is greater than the first pressure.

A battery pack according to embodiments of the present disclosure includes a batter. The battery includes: a shell having an inner cavity; a wound core assembled in the inner cavity of the shell; a column supported in the wound core to prevent the wound core from collapsing, wherein the column includes a first cavity configured to store a lithium-replenishing medium and a second cavity configured to store a fire-fighting medium, a cavity wall of the first cavity having a first hole, and a cavity wall of the second cavity having a second hole; a first membrane configured to block the first hole, the first membrane being configured to break when subjected to a first pressure, allowing the lithium-replenishing medium in the first cavity to flow into the inner cavity through the first hole; and a second membrane configured to block the second hole, the second membrane being configured to break when subjected to a second pressure, allowing the fire-fighting medium in the second cavity to flow into the inner cavity through the second hole, wherein the second pressure is greater than the first pressure.

Electric equipment according to embodiments of the present disclosure includes a battery or a battery pack including the battery. The battery includes: a shell having an inner cavity; a wound core assembled in the inner cavity of the shell; a column supported in the wound core to prevent the wound core from collapsing, wherein the column includes a first cavity configured to store a lithium-replenishing medium and a second cavity configured to store a fire-fighting medium, a cavity wall of the first cavity having a first hole, and a cavity wall of the second cavity having a second hole; a first membrane configured to block the first hole, the first membrane being configured to break when subjected to a first pressure, allowing the lithium-replenishing medium in the first cavity to flow into the inner cavity through the first hole; and a second membrane configured to block the second hole, the second membrane being configured to break when subjected to a second pressure, allowing the fire-fighting medium in the second cavity to flow into the inner cavity through the second hole, wherein the second pressure is greater than the first pressure.

Figure 1:
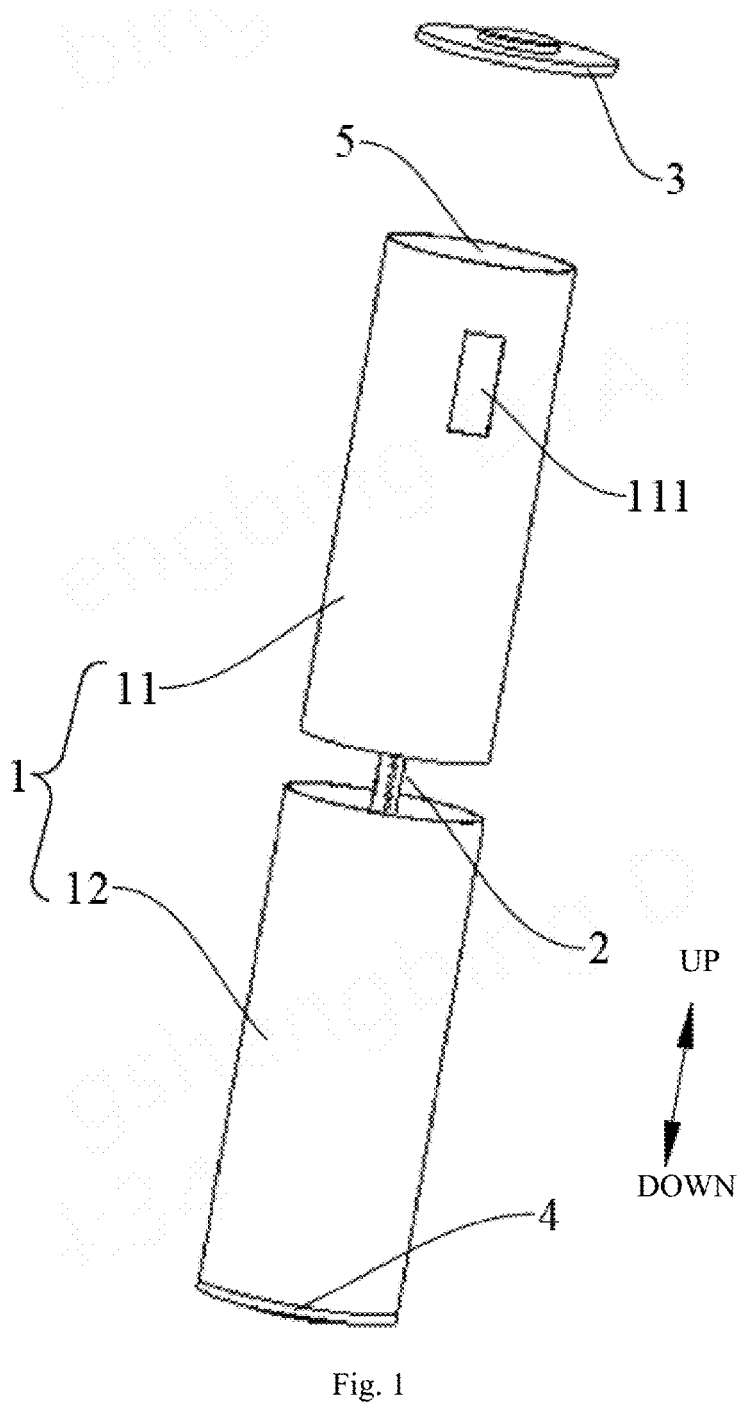
FIG. 1 is an exploded view of a battery according to embodiments of the present disclosure.

REFERENCE NUMERALS shell 1; inner shell 11; third hole 111; fourth hole 112; outer shell 12; second partition portion 13; third cavity 14; fourth cavity 15;

column 2; first cavity 21; first hole 211; second cavity 22; second hole 221; first partition portion 23;

first end cover 3;

second end cover 4;

inner cavity 5.

DETAILED DESCRIPTION

Embodiments of the present disclosure will be described in detail and examples of the embodiments are shown in accompanying drawings. The embodiments described below with reference to the drawings are exemplary and are intended to explain the present disclosure rather than limit the present disclosure.

Figure 2:
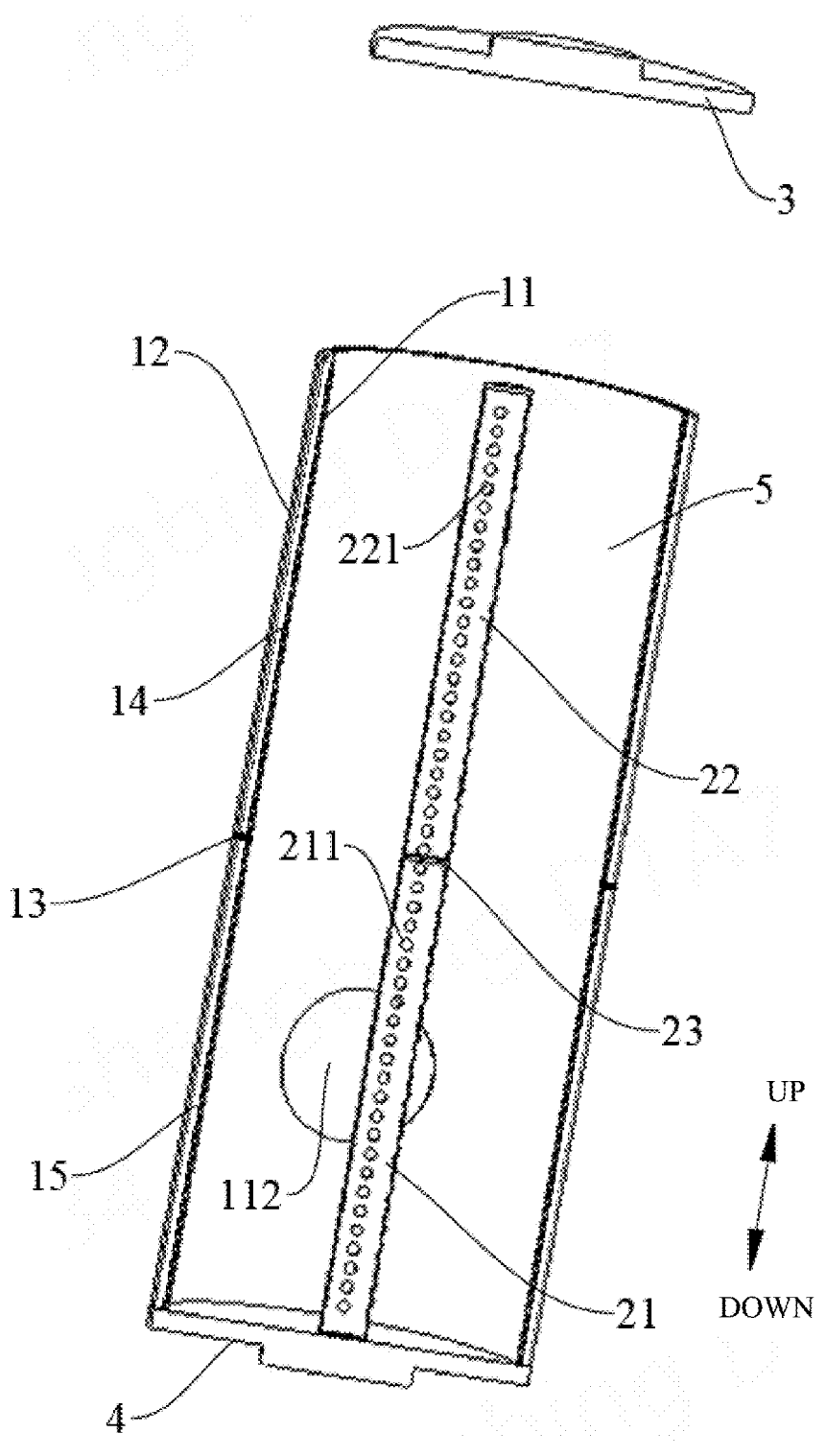
FIG. 2 is a sectional view of a battery according to embodiments of the present disclosure.

As shown in FIGS. 1 and 2, a battery according to the embodiments of the present disclosure includes a shell 1, a wound core (not shown), a column 2, a first membrane, and a second membrane.

The shell 1 has an inner cavity 5. For example, the shell 1 has an integral structure and is generally columnar, and an inner space of the shell 1 forms the inner cavity 5. When in use, the inner cavity 5 of the shell 1 is filled with electrolyte.

The wound core includes a positive pole piece, a negative pole piece, and a diaphragm between the positive pole piece and the negative pole piece. The wound core is a structure formed by winding the positive pole piece, the negative pole piece, and the diaphragm. When the battery, is assembled, the wound core is mounted in the inner cavity 5 of the shell 1.

The column 2 is supported in the wound core to prevent the wound core from collapsing. The column 2 includes a first cavity 21 for storing a lithium-replenishing medium and a second cavity 22 for storing a fire-fighting medium. A cavity wall of the first cavity 21 has a first hole 211, and a cavity wall of the second cavity 22 has a second hole 221.

For example, there is a central hole in a center of the wound core, and the column 2 is inserted and fitted in the central hole. With the support of the column 2, a situation that the wound core collapses towards the center can be avoided, and the structural strength and stability can be improved.

As shown in FIG. 2, the column 2 has a hollow structure, and there are two closed cavities in the column 2, which are the first cavity 21 and the second cavity 22. The first cavity 21 and the second cavity 22 are spaced apart from each other along an axial direction (in an up-down direction) of the column 2. In other embodiments, the first cavity 21 and the second cavity 22 are spaced apart from each other along a peripheral direction of the column 2. For example, the first cavity 21 and the second cavity 22 are opposite to each other in a radial direction of the column 2.

The first cavity 21 is used to store the lithium-replenishing medium that may be a lithium-replenishing agent (a lithium salt solution) or may be other types of media such as lithium powder in other embodiments. The second cavity 22 is used to store the fire-fighting medium that may be perfluoro-hexanone or may be a flame-retardant medium such as alkyl phosphate and heptafluoropropane in other embodiments.

As shown in FIG. 2, the column 2 includes the first hole 211 and the second hole 221 that extend along the radial direction of the column 2. The first hole 211 penetrates outer wall surfaces of the first cavity 21 and the column 2, i.e., the first hole 211 makes the first cavity 21 be in connection with the inner cavity 5 of the shell 1. The second hole 221 penetrates outer wall surfaces of the second cavity 22 and the column 2, i.e., the second hole 221 makes the second cavity 22 be in connection with the inner cavity 5 of the shell 1.

The first membrane (not shown) is arranged on the column 2 and seals the first hole 211, so that the first hole 211 is blocked by the first membrane, thereby separating the first cavity 21 from the inner cavity 5 of the shell 1. Similarly, the second membrane (not shown) is arranged on the column 2 and seals the second hole 221, so that the second hole 221 is blocked by the second membrane, thereby separating the second cavity 22 from the inner cavity 5 of the shell 1.

After long-term use of the battery, lithium ions in the battery will be consumed and become insufficient, and gas produced in the battery will increase and accumulate. When the gas increases to a certain extent, i.e., when a gas pressure in the shell 1 reaches a first pressure, the first membrane breaks under the action of the first pressure. At this time, the first cavity 21 is in connection with the inner cavity 5 of the shell 1 through the first hole 211, and the lithium-replenishing medium in the first cavity 21 flows into the inner cavity 5 of the shell 1 through the first hole 211. In such a way, the replenishment of lithium ion content in the electrolyte can be realized.

In addition, when the battery is out of thermal control or in a condition of rapid gas production due to abuse, the gas pressure in the shell 1 reaches a second pressure, and the second membrane breaks under the action of the second pressure. At this time, the second cavity 22 is in connection with the inner cavity 5 of the shell 1 through the second hole 221, and the fire-fighting medium in the second cavity 22 flows into the shell 1 through the second hole 221 and plays a role in fire-fighting and extinguishing.

It should be noted that the second pressure is greater than the first pressure, so that the second membrane will not be damaged in normal use, i.e., the fire-fighting medium will not flow out of the second cavity 22, thus ensuring the stability of using the battery.

The battery according to the embodiments of the present disclosure can realize secondary lithium replenishment and address the problems of short battery life and serious attenuation, and has fire control and fire extinguishing functions when the battery is out of thermal control or in the condition of rapid gas production, thus ensuring the safety of using the battery.

In some embodiments, the battery includes a third membrane, and the shell 1 includes a third cavity 14 for storing a lithium-replenishing medium. A cavity wall of the third cavity 14 has a third hole 111, and the third membrane seals and blocks the third hole 111. When the third membrane is subjected to a third pressure, the third membrane breaks, so that the lithium-replenishing medium in the third cavity 14 flows into the inner cavity 5 through the third hole 111. The third pressure is smaller than the second pressure.

For example, the shell 1 is designed to have a sandwich-type structure with the third cavity 14 alone formed in a sandwiched space, and the shell 1 only has the third cavity 14. The third hole 111 is in an inner wall of the shell 1 and extends along a radial direction of the shell 1. The third hole 111 serves to connect the third cavity 14 with the inner cavity 5 of the shell 1. The third membrane (not shown) is arranged on the inner wall of the shell 1 and seals the third hole 111. Therefore, the third membrane can block the third hole 111, thereby separating the third cavity 14 from the inner cavity 5 of the shell 1.

As the produced gas accumulates in the battery, the third membrane will break under the action of the third pressure when the gas pressure reaches the third pressure. At this time, the third cavity 14 is in connection with the inner cavity 5 of the shell 1 through the third hole 111, and the lithium-replenishing medium in the third cavity 14 flows into the inner cavity 5 of the shell 1 through the third hole 111. In such a way, the replenishment of lithium ion content in the electrolyte can be realized.

It should be noted that the third pressure is smaller than the second pressure, so that the second membrane will not be damaged in normal use of the battery, and only a lithium replenishment effect can be realized. Moreover, the third pressure may be different from the first pressure, so that lithium can be replenished in a gradient manner. That is, with the increase of the gas pressure inside the battery, lithium ions in the electrolyte can be first replenished by the lithium-replenishing medium in one of the first cavity 21 and the third cavity 14, and as the gas pressure continues to increase, lithium ions can be then replenished by the lithium-replenishing medium in the other of the first cavity 21 and the third cavity 14.

In some embodiments, the battery includes a fourth membrane, and the shell 1 includes a fourth cavity 15 for storing a fire-fighting medium. A cavity wall of the fourth cavity 15 has a fourth hole 112, and the fourth membrane blocks the fourth hole 112. The fourth membrane breaks when subjected to a fourth pressure, so that the fire-fighting medium in the fourth cavity 15 flows into the inner cavity 5 through the fourth hole 112. The fourth pressure is greater than the first pressure.

For example, the shell 1 is designed to have a sandwich-type structure with the fourth cavity 15 alone formed in a sandwiched space, and the shell 1 only has the fourth cavity 15. The fourth hole 112 is in the inner wall of the shell 1 and extends along the radial direction of the shell 1. The fourth hole 112 serves to connect the fourth cavity 15 with the inner cavity 5 of the shell 1. The fourth membrane (not shown) is arranged on the inner wall of the shell 1 and seals the fourth hole 112. Therefore, the fourth membrane can block the fourth hole 112, thereby separating the fourth cavity 15 from the inner cavity 5 of the shell 1.

As the produced gas accumulates in the battery, the fourth membrane will break under the action of the fourth pressure when the gas pressure reaches the fourth pressure. At this time, the fourth cavity 15 is in connection with the inner cavity 5 of the shell 1 through the fourth hole 112, and the fire-fighting medium in the fourth cavity 15 flows into the inner cavity 5 of the shell 1 through the fourth hole 112 to implement fire control and fire extinguishing. It should be noted that the fourth pressure is greater than the first pressure, so that the fourth membrane will not be damaged in normal use of the battery. Moreover, the fourth pressure may be identical to or different from the second pressure.

In some embodiments, the battery includes the third membrane and the fourth membrane; and the shell 1 includes the third cavity 14 for storing the lithium-replenishing medium and the fourth cavity 15 for storing the fire-fighting medium. The cavity wall of the third cavity 14 has the third hole 111, and the cavity wall of the fourth cavity 15 has the fourth hole 112.

For example, the shell 1 includes two sealed cavities that are the third cavity 14 and the fourth cavity 15. The third cavity 14 stores a lithium-replenishing medium that may be the same as the lithium-replenishing medium in the first cavity 21. In other embodiments, the lithium-replenishing medium in the third cavity 14 may be different from the lithium-replenishing medium in the first cavity 21, to avoid a situation that a single lithium-replenishing medium fails and cannot achieve the lithium replenishment effect, thus providing double assurance.

The fourth cavity 15 stores a fire-fighting medium that may be the same as the fire-fighting medium in the second cavity 22. In other embodiments, the fire-fighting medium in the fourth cavity 15 may be different from the fire-fighting medium in the second cavity 22, to avoid a situation that a single fire-fighting medium fails and cannot achieve a fire-fighting effect, thus providing double assurance.

The third hole 111 is in the inner wall of the shell 1 and extends along the radial direction of the shell 1. The third hole 111 is configured to connect the third cavity 14 with the inner cavity 5 of the shell 1. The fourth hole 112 is in the inner wall of the shell 1 and extends along the radial direction of the shell 1. The fourth hole 112 is configured to connect the fourth cavity 15 with the inner cavity 5 of the shell 1.

The third membrane (not shown) is arranged on the inner wall of the shell 1 and seals the third hole 111. Therefore, the third membrane can block the third hole 111, thereby separating the third cavity 14 from the inner cavity 5 of the shell 1. Similarly, the fourth membrane (not shown) is arranged on the inner wall of the shell 1 and seals the fourth hole 112. Therefore, the fourth membrane can block the fourth hole 112, thereby separating the fourth cavity 15 from the inner cavity 5 of the shell 1.

After long-term use of the battery, the gas produced in the battery will increase and accumulate. When the gas pressure reaches the first pressure, the third membrane breaks under the action of the first pressure. At this time, the third cavity 14 is in connection with the inner cavity 5 of the shell 1 through the third hole 111, and the lithium-replenishing medium in the third cavity 14 flows into the inner cavity 5 of the shell 1 through the third hole 111. In such a way, the replenishment of lithium ion content in the electrolyte can be realized.

Therefore, the lithium-replenishing media in both the first cavity 21 and the third cavity 14 can replenish lithium ions to the electrolyte in the shell 1 simultaneously from an inner direction and an outer direction, thereby ensuring balance of lithium ion distribution and improving the efficiency of lithium ion replenishment.

In addition, when the battery is out of thermal control or in a condition of rapid gas production due to abuse, the gas pressure in the shell 1 reaches the second pressure, and the fourth membrane breaks under the action of the second pressure. At this time, the fourth cavity 15 is in connection with the inner cavity 5 of the shell 1 through the fourth hole 112, and the fire-fighting medium in the fourth cavity 15 flows into the shell 1 through the fourth hole 112 and plays a role in fire-fighting and extinguishing.

Therefore, the fire-fighting media in both the second cavity 22 and the fourth cavity 15 can release the fire-fighting media into the shell 1 from the inner direction and the outer direction, which can improve the fire-fighting and fire-extinguishing efficiency, provide double assurance and further ensure the safety of using the battery.

In some embodiments, the third cavity 14 corresponds to the second cavity 22 in the inner-outer direction of the shell 1, and the fourth cavity 15 corresponds to the first cavity 21 in the inner-outer direction of the shell 1. For example, as shown in FIG. 2, the column 2 includes only one first cavity 21 and only one second cavity 22, and the first cavity 21 is below the second cavity 22. The shell 1 includes only one third cavity 14 and only one fourth cavity 15. The third cavity 14 is above the fourth cavity 15 and at a peripheral side of the second cavity 22. The fourth cavity 15 is at a peripheral side of the first cavity 21.

In such a way, the lithium-replenishing and fire-fighting media in the column 2 and the lithium-replenishing and fire-fighting media in the shell 1 are arranged in a staggered manner in an axial direction of the battery, achieving a complementary effect on the inner and outer sides. The balance of lithium ion distribution after lithium replenishment and the balance of fire-fighting media distribution during fire extinguishing can be improved, and hence the lithium replenishment effect and the fire-fighting effect can be enhanced.

In some embodiments, the third cavity 14 is an annular cavity and surrounds the second cavity 22. Therefore, the storage capacity of the lithium-replenishing medium can be increased, and it is also beneficial to realizing the lithium replenishment from the outside in a plurality of directions. At this time, it is necessary to arrange a plurality of third holes 111 spaced apart from each other along the peripheral direction, which can further improve the distribution balance of the lithium-replenishing medium and the lithium replenishment effect.

In some embodiments, the fourth cavity 15 is also an annular cavity and surrounds the first cavity 21. Therefore, the storage capacity of the fire-fighting medium can be increased, and it is also beneficial to realizing replenishment of the fire-fighting medium from the outside in a plurality of directions. At this time, it is necessary to arrange a plurality of fourth holes 112 spaced apart from each other along the peripheral direction, which can further improve the distribution balance of the fire-fighting medium and the fire-fighting medium effect.

In some embodiments, there are a plurality of first cavities 21 and a plurality of second cavities 22. The plurality of first cavities 21 and the plurality of second cavities 22 are alternately arranged one by one along the axial direction of the battery (i.e., an up-down direction in FIG. 2). In such a way, the distribution balance of the lithium-replenishing medium and the fire-fighting medium flowing out of the column 2 can be further improved, and the lithium-replenishing efficiency and the fire-fighting efficiency can be further enhanced.

In other embodiments, there are a plurality of third cavities 14 and a plurality of fourth cavities 15. The plurality of third cavities 14 and the plurality of fourth cavities 15 are alternately arranged one by one along the axial direction of the battery (i.e., the up-down direction in FIG. 2). In such a way, the distribution balance of the lithium-replenishing medium and the fire-fighting medium flowing out of the shell 1 can be further improved, and the lithium-replenishing efficiency and the fire-fighting efficiency can be further enhanced.

In some embodiments, as shown in FIGS. 1 and 2, the shell 1 has a split structure and includes an inner shell 11 and an outer shell 12. The inner shell 11 and the outer shell 12 are both cylindrical, and the outer shell 12 surrounds the inner shell 11. An inner space of the inner shell 11 forms the inner cavity 5 for storing the electrolyte, and the column 2 is also arranged in the inner shell 11. The first hole 211, the second hole 221, the third membrane, and the fourth membrane are all arranged on the inner shell 11. The third cavity 14 and the fourth cavity 15 are formed in an annular space between the inner shell 11 and the outer shell 12. In such a way, the processing and production of the shell 1 can be facilitated, and the processing or arrangement of the first hole 211, the second hole 221, the third membrane, and the fourth membrane can be facilitated.

In some embodiments, the battery includes a first end cover 3 and a second end cover 4. The inner shell 11 and the outer shell 12 are both connected between the first end cover 3 and the second end cover 4. The column 2 has a first end abutting against or connected to the first end cover 3, and a second end abutting against or connected to the second end cover 4.

For example, as shown in FIGS. 1 and 2, the first end cover 3 is mounted at a top of the shell 1, and is a positive-pole end cover of the battery; and a positive-pole post is mounted in the first end cover 3. The second end cover 4 is mounted at a bottom of the shell 1 and is a negative-pole end cover of the battery; and a negative-pole post is mounted in the second end cover 4.

A top end of the inner shell 11 and a top end of the outer shell 12 are both connected and sealed with the first end cover 3. A bottom end of the inner shell 11 and a bottom end of the outer shell 12 are both connected and sealed with the second end cover 4. In such a way, the inner cavity 5 of the shell 1 can be sealed and blocked, realizing a requirement of filling the electrolyte.

A top end of the column 2 abuts against the first end cover 3. For example, the first end cover 3 includes a slot, and the top end of the column 2 is inserted and fitted in the slot, so as to achieve a position limiting effect. Similarly, a bottom end of the column 2 abuts against the second end cover 4. For example, the second end cover 4 also includes a slot, and the bottom end of the column 2 is inserted and fitted in the slot of the second end cover, so as to achieve a position limiting effect. Therefore, the structural stability of assembling the column 2 can be ensured.

Optionally, the column 2 is made of an insulation material, for example, plastic, which can provide insulation and protection.

In some embodiments, shapes of the first hole 211 and the second hole 221 are different. For example, the first hole 211 is a square hole while the second hole 221 is a circular hole. The first cavity 21 and the second cavity 22 can be distinguished by identifying different hole shapes, which facilitates the injection of the lithium-replenishing medium into the first cavity 21 and the injection of the fire-fighting medium into the second cavity 22.

In some embodiments, shapes of the third hole 111 and the fourth hole 112 are different. For example, as shown in FIG. 1, the third hole 111 is a rectangular hole, and as shown in FIG. 2, the fourth hole 112 is a circular hole, so that the third cavity 14 and the fourth cavity 15 can be distinguished by identifying different hole shapes.

In some embodiments, as shown in FIG. 2, the column 2 includes a first partition portion 23 that may be a baffle. The first partition portion 23 is fixed in the column 2, and the first cavity 21 and the second cavity 22 are isolated by the first partition portion 23.

In some embodiments, as shown in FIG. 2, the shell 1 includes a second partition portion 13 that may be an annular baffle. The second partition portion 13 is fixed between the inner shell 11 and the outer shell 12, and the third cavity 14 and the fourth cavity 15 are isolated by the second partition portion 13.

In some embodiments, there are a plurality of first holes 211 in the cavity wall of the first cavity 21, and the first membrane is wrapped on an outer peripheral side of the column 2 and blocks the plurality of first holes 211. For example, as shown in FIG. 2, the plurality of first holes 211 are arranged at equal intervals along an axial direction of the column 2, and all the first holes 211 corresponding to the first cavity 21 can be sealed and blocked by a single first membrane. Therefore, during use, the outflow efficiency and distribution balance of the lithium-replenishing medium can be improved, and the lithium replenishment effect can be enhanced. In other embodiments, the plurality of first holes 211 corresponding to the first cavity 21 are arranged at equal intervals along the peripheral direction.

In some embodiments, there are a plurality of second holes 221 in the cavity wall of the second cavity 22, and the second membrane is wrapped on an outer peripheral side of the column 2 and blocks the plurality of second holes 221. For example, as shown in FIG. 2, the plurality of second holes 221 are arranged at equal intervals along the axial direction of the column 2, and all the second holes 221 corresponding to the second cavity 22 can be sealed and blocked by a single second membrane. Therefore, during use, the outflow efficiency and distribution balance of the fire-fighting medium can be improved, and the fire-fighting effect can be enhanced. In other embodiments, the plurality of second holes 221 corresponding to the second cavity 22 are arranged at equal intervals along the peripheral direction.

In some embodiments, the lithium-replenishing medium and the fire-fighting medium are liquid media, and the first membrane, the second membrane, the third membrane and the fourth membrane are elastic liquid-proof membranes, for example, waterproof and breathable membranes, which can effectively block the liquid media.

A battery pack according to embodiments of the present disclosure will be described below.

The battery pack according to embodiments of the present disclosure includes a plurality of batteries, at least part of which are the batteries described in any of the above embodiments. The plurality of batteries are connected in series or in parallel, to meet a requirement of large-capacity power supply.

Electric equipment according to embodiments of the present disclosure will be described below.

The electric equipment according to embodiments of the present disclosure can meet power supply needs by the battery or the battery pack in any of the above embodiments. When the battery is used, the electric equipment may be a clock, a remote controller and so on. When the battery pack is used, the electric equipment may be a new energy vehicle, an electric vehicle and the like. Power demands in different scenarios can be satisfied.

Embodiments of the present disclosure propose a battery, a battery pack, and electric equipment.

The battery according to embodiments of the present disclosure includes: a shell having an inner cavity; a wound core assembled in the inner cavity of the shell; a column supported in the wound core to prevent the wound core from collapsing, wherein the column includes a first cavity configured to store a lithium-replenishing medium and a second cavity configured to store a fire-fighting medium, a cavity wall of the first cavity having a first hole, and a cavity wall of the second cavity having a second hole; a first membrane configured to block the first hole, the first membrane being configured to break when subjected to a first pressure, allowing the lithium-replenishing medium in the first cavity to flow into the inner cavity through the first hole; and a second membrane configured to block the second hole, the second membrane being configured to break when subjected to a second pressure, allowing the fire-fighting medium in the second cavity to flow into the inner cavity through the second hole, wherein the second pressure is greater than the first pressure.

The battery according to the embodiments of the present disclosure can realize secondary lithium replenishment and address the problems of short battery life and serious attenuation, and has fire control and fire extinguishing functions when the battery is out of thermal control or in the condition of rapid gas production, thus ensuring the safety of using the battery.

In some embodiments, the battery includes a third membrane, and the shell includes a third cavity configured to store a lithium-replenishing medium; a cavity wall of the third cavity has a third hole, and the third membrane is configured to block the third hole; and the third membrane is configured to break when subjected to a third pressure, allowing the lithium-replenishing medium in the third cavity to flow into the inner cavity through the third hole, the third pressure being smaller than the second pressure.

In some embodiments, the battery includes a fourth membrane, and the shell includes a fourth cavity configured to store a fire-fighting medium; a cavity wall of the fourth cavity has a fourth hole, and the fourth membrane is configured to block the fourth hole; and the fourth membrane is configured to break when subjected to a fourth pressure, allowing the fire-fighting medium in the fourth cavity to flow into the inner cavity through the fourth hole, the fourth pressure being greater than the first pressure.

In some embodiments, the battery includes a third membrane and a fourth membrane, and the shell includes a third cavity configured to store a lithium-replenishing medium and a fourth cavity configured to store a fire-fighting medium; a cavity wall of the third cavity has a third hole, and a cavity wall of the fourth cavity has a fourth hole; the third membrane is configured to block the third hole, and the third membrane is configured to break when subjected to first pressure, allowing the lithium-replenishing medium in the third cavity to flow into the inner cavity through the third hole; and the fourth membrane is configured to block the fourth hole, and the fourth membrane is configured to break when subjected to the second pressure, allowing the fire-fighting medium in the fourth cavity to flow into the inner cavity through the fourth hole.

In some embodiments, the third cavity corresponds to the second cavity and the fourth cavity corresponds to the first cavity in an inner-outer direction of the shell.

In some embodiments, the third cavity is an annular cavity and surrounds the second cavity; and/or the fourth cavity is an annular cavity and surrounds the first cavity.

In some embodiments, there are a plurality of first cavities and a plurality of second cavities, and the plurality of first cavities and the plurality of second cavities are alternately arranged one by one along an axial direction of the battery; and/or there are a plurality of third cavities and a plurality of fourth cavities, and the plurality of third cavities and the plurality of fourth cavities are alternately arranged one by one along the axial direction of the battery.

In some embodiments, the shell includes an inner shell and an outer shell surrounding the inner shell; the inner cavity is formed in the inner shell, and the first hole, the second hole, the third membrane, and the fourth membrane are arranged on the inner shell; and the third cavity and the fourth cavity are formed between the inner shell and the outer shell.

In some embodiments, the battery includes a first end cover and a second end cover; the inner shell and the outer shell are connected between the first end cover and the second end cover, and the column has a first end abutting against or connected to the first end cover and a second end abutting against or connected to the second end cover.

In some embodiments, shapes of the first hole and the second hole are different, and/or shapes of the third hole and the fourth hole are different.

In some embodiments, the column includes a first partition portion, and the first cavity and the second cavity are isolated by the first partition portion; and/or the shell includes a second partition portion, and the third cavity and the fourth cavity are isolated by the second partition portion.

In some embodiments, there are a plurality of first holes in the cavity wall of the first cavity, and the first membrane is wrapped on an outer peripheral side of the column and blocks the plurality of first holes; and/or there are a plurality of second holes in the cavity wall of the second cavity, and the second membrane is wrapped on an outer peripheral side of the column and blocks the plurality of second holes.

In some embodiments, the column is made of an insulation material.

In some embodiments, the lithium-replenishing medium includes at least one of lithium powder and a lithium salt solution; and/or the fire-fighting medium includes at least one of perfluorohexanone, alkyl phosphate and heptafluoropropane.

The battery pack according to embodiments of the present disclosure includes the battery as described in any of the above embodiments.

The electric equipment according to embodiments of the present disclosure includes the battery as described in any of the above embodiments or includes the battery pack as described in any of the above embodiments.

In the description of the present disclosure, it should be understood that terms such as "central," "longitudinal," "transverse," "front," "rear," "left," "right," "vertical," "horizontal," "top," "bottom," "inner," "outer," "clockwise," "anticlockwise," "axial," "radial" and "peripheral" are refer to the orientation or relative position as shown in the drawings. These relative terms are for convenience and simplification of description of the present disclosure and do not indicate or imply that the device or element referred to must have a particular orientation or be constructed and operated in a particular orientation. Hence, these relative terms shall not be construed to limit the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example two or three, unless specified otherwise.

In the present disclosure, unless specified or limited otherwise, terms such as "mounted," "connected," "coupled," "fixed" and the like are used broadly, and may be, for example, fixed connections, detachable connections, or integral connections; may also be mechanical or electrical connections; may also refer to communicate with each other; may also be direct connections or indirect connections via intervening structures; may also be inner connection or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine and unit different embodiments or examples as well as features of different embodiments or examples described in this specification in case of no mutual contraction.

Although some embodiments have been shown and described above, it would be appreciated by those skilled in the art that the above embodiments are exemplary and cannot be construed to limit the present disclosure, and changes, modifications, alternatives, and variations can be made in the embodiments without departing from the scope of the present disclosure.

What is claimed is:

1. A battery, comprising:
a shell having an inner cavity;
a wound core assembled in the inner cavity of the shell;
a column supported in the wound core to prevent the wound core from collapsing, wherein the column comprises a first cavity configured to store a lithium-replenishing medium and a second cavity configured to store a fire-fighting medium, a cavity wall of the first cavity having a first hole, and a cavity wall of the second cavity having a second hole;
a first membrane configured to block the first hole, the first membrane being configured to break when subjected to a first pressure, allowing the lithium-replenishing medium in the first cavity to flow into the inner cavity through the first hole; and
a second membrane configured to block the second hole, the second membrane being configured to break when subjected to a second pressure, allowing the fire-fighting medium in the second cavity to flow into the inner cavity through the second hole, wherein the second pressure is greater than the first pressure.

2. The battery according to claim 1, wherein:
the battery comprises a third membrane, and the shell comprises a third cavity configured to store a lithium-replenishing medium;
a cavity wall of the third cavity has a third hole, and the third membrane is configured to block the third hole; and
the third membrane is configured to break when subjected to a third pressure, allowing the lithium-replenishing medium in the third cavity to flow into the inner cavity through the third hole, wherein the third pressure is smaller than the second pressure.

3. The battery according to claim 1, wherein:
the battery comprises a fourth membrane, and the shell comprises a fourth cavity configured to store a fire-fighting medium;
a cavity wall of the fourth cavity has a fourth hole, and the fourth membrane is configured to block the fourth hole; and
the fourth membrane is configured to break when subjected to a fourth pressure, allowing the fire-fighting medium in the fourth cavity to flow into the inner cavity through the fourth hole, wherein the fourth pressure is greater than the first pressure.

4. The battery according to claim 1, wherein:
the battery comprises a third membrane and a fourth membrane, and the shell comprises a third cavity configured to store a lithium-replenishing medium and a fourth cavity configured to store a fire-fighting medium;
a cavity wall of the third cavity has a third hole, and a cavity wall of the fourth cavity has a fourth hole;
the third membrane is configured to block the third hole, and the third membrane is configured to break when subjected to the first pressure, allowing the lithium-replenishing medium in the third cavity to flow into the inner cavity through the third hole; and
the fourth membrane is configured to block the fourth hole, and the fourth membrane is configured to break when subjected to the second pressure, allowing the fire-fighting medium in the fourth cavity to flow into the inner cavity through the fourth hole.

5. The battery according to claim 4, wherein the third cavity corresponds to the second cavity and the fourth cavity corresponds to the first cavity in an inner-outer direction of the shell.

6. The battery according to claim 5, wherein the third cavity is an annular cavity and surrounds the second cavity.

7. The battery according to claim 5, wherein the fourth cavity is an annular cavity and surrounds the first cavity.

8. The battery according to claim 5, wherein:

there are a plurality of first cavities and a plurality of second cavities, and the plurality of first cavities and the plurality of second cavities are alternately arranged one by one along an axial direction of the battery.

9. The battery according to claim 5, wherein:

there are a plurality of third cavities and a plurality of fourth cavities, and the plurality of third cavities and the plurality of fourth cavities are alternately arranged one by one along the axial direction of the battery.

10. The battery according to claim 4, wherein:

the shell comprises an inner shell and an outer shell surrounding the inner shell;

the inner cavity is formed in the inner shell, and the first hole, the second hole, the third membrane, and the fourth membrane are arranged on the inner shell; and the third cavity and the fourth cavity are formed between the inner shell and the outer shell.

11. The battery according to claim 10, comprising a first end cover and a second end cover, wherein the inner shell and the outer shell are connected between the first end cover and the second end cover, and the column has a first end abutting against or connected to the first end cover and a second end abutting against or connected to the second end cover.

12. The battery according to claim 4, wherein shapes of the first hole and the second hole are different, and shapes of the third hole and the fourth hole are different.

13. The battery according to claim 4, wherein the column comprises a first partition portion, and the first cavity and the second cavity are isolated by the first partition portion.

14. The battery according to claim 4, wherein the shell comprises a second partition portion, and the third cavity and the fourth cavity are isolated by the second partition portion.

15. The battery according to claim 1, wherein:

there are a plurality of first holes in the cavity wall of the first cavity, and the first membrane is wrapped on an outer peripheral side of the column and blocks the plurality of first holes.

16. The battery according to claim 1, wherein:

there are a plurality of second holes in the cavity wall of the second cavity, and the second membrane is wrapped on an outer peripheral side of the column and blocks the plurality of second holes.

17. The battery according to claim 1, wherein the column is made of an insulation material.

18. The battery according to claim 1, wherein:

the lithium-replenishing medium comprises at least one of lithium powder or a lithium salt solution; and the fire-fighting medium comprises at least one of perfluorohexanone, alkyl phosphate or heptafluoropropane.

19. A battery pack, comprising a battery, wherein the battery comprises:

a shell having an inner cavity;

a wound core assembled in the inner cavity of the shell;

a column supported in the wound core to prevent the wound core from collapsing, wherein the column comprises a first cavity configured to store a lithium-replenishing medium and a second cavity configured to store a fire-fighting medium, a cavity wall of the first cavity having a first hole, and a cavity wall of the second cavity having a second hole;

a first membrane configured to block the first hole, the first membrane being configured to break when subjected to a first pressure, allowing the lithium-replenishing medium in the first cavity to flow into the inner cavity through the first hole; and a second membrane configured to block the second hole, the second membrane being configured to break when subjected to a second pressure, allowing the fire-fighting medium in the second cavity to flow into the inner cavity through the second hole, wherein the second pressure is greater than the first pressure.

20. Electric equipment, comprising a battery or comprising a battery pack having the battery, wherein the battery comprises:

a shell having an inner cavity;

a wound core assembled in the inner cavity of the shell;

a column supported in the wound core to prevent the wound core from collapsing, wherein the column comprises a first cavity configured to store a lithium-replenishing medium and a second cavity configured to store a fire-fighting medium, a cavity wall of the first cavity having a first hole, and a cavity wall of the second cavity having a second hole;

a first membrane configured to block the first hole, the first membrane being configured to break when subjected to a first pressure, allowing the lithium-replenishing medium in the first cavity to flow into the inner cavity through the first hole; and a second membrane configured to block the second hole, the second membrane being configured to break when subjected to a second pressure, allowing the fire-fighting medium in the second cavity to flow into the inner cavity through the second hole, wherein the second pressure is greater than the first pressure.

* * * * *